(12) United States Patent
Lee

(10) Patent No.: US 10,735,172 B2
(45) Date of Patent: Aug. 4, 2020

(54) DEVICE AND METHOD OF HANDLING CHANNEL STATUS INFORMATION FOR UNLICENSED SERVING CELL

(71) Applicant: ACER INCORPORATED, New Taipei (TW)

(72) Inventor: Chien-Min Lee, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 86 days.

(21) Appl. No.: 15/006,125

(22) Filed: Jan. 26, 2016

(65) Prior Publication Data

US 2016/0226648 A1 Aug. 4, 2016

Related U.S. Application Data

(60) Provisional application No. 62/109,079, filed on Jan. 29, 2015.

(51) Int. Cl.
*H04L 5/00* (2006.01)
*H04L 1/00* (2006.01)
*H04W 16/14* (2009.01)

(52) U.S. Cl.
CPC .......... *H04L 5/0057* (2013.01); *H04L 1/0026* (2013.01); *H04L 5/0048* (2013.01); *H04W 16/14* (2013.01)

(58) Field of Classification Search
CPC ... H04L 5/0057; H04L 5/0048; H04L 1/0026; H04W 16/14
See application file for complete search history.

(56) References Cited

U.S. PATENT DOCUMENTS

| | | | |
|---|---|---|---|
| 9,055,565 B2* | 6/2015 | Kim | H04L 5/001 |
| 2012/0176924 A1 | 7/2012 | Wu | |
| 2012/0250549 A1* | 10/2012 | Lee | H04L 5/0007 370/252 |
| 2013/0163461 A1* | 6/2013 | Kim | H04B 7/0626 370/252 |
| 2013/0201884 A1 | 8/2013 | Freda | |
| 2013/0336214 A1 | 12/2013 | Sayana | |
| 2014/0036881 A1 | 2/2014 | Kim | |

(Continued)

FOREIGN PATENT DOCUMENTS

| | | |
|---|---|---|
| CN | 1833454 A | 9/2006 |
| CN | 101908951 A | 12/2010 |

(Continued)

OTHER PUBLICATIONS

Samsung, "Discussion on CSI measurement aspects for LAA", 3GPP TSG RAN WG1 #79, R1-144743, Nov. 17-21, 2014, pp. 1-3.

(Continued)

*Primary Examiner* — Peter P Chau
(74) *Attorney, Agent, or Firm* — Winston Hsu

(57) ABSTRACT

A communication device of handling a channel status information (CSI) report for an unlicensed serving cell comprises a storage unit for storing instructions and a processing means coupled to the storage unit. The processing means is configured to execute the instructions stored in the storage unit. The instructions comprise determining an indication for indicating a validity of an unlicensed CSI (U-CSI) report; and transmitting the indication to a network.

5 Claims, 7 Drawing Sheets

(56) References Cited

U.S. PATENT DOCUMENTS

| | | |
|---|---|---|
| 2014/0086174 A1 | 3/2014 | Nam |
| 2014/0112277 A1 | 4/2014 | Yang |
| 2014/0376523 A1* | 12/2014 | Lee ............. H04L 5/0048 370/336 |
| 2015/0092698 A1 | 4/2015 | Seo |
| 2016/0073370 A1* | 3/2016 | Axmon ........... H04W 56/0015 370/350 |
| 2016/0135070 A1* | 5/2016 | Lee ............. H04L 5/0053 370/252 |
| 2016/0192331 A1* | 6/2016 | Liang ........... H04L 5/0048 370/329 |
| 2016/0241434 A1* | 8/2016 | Li ............. H04B 7/2656 |
| 2016/0255577 A1* | 9/2016 | Kazmi ........... H04W 52/0206 370/311 |
| 2017/0064705 A1* | 3/2017 | Lee ............. H04L 1/0026 |
| 2017/0170940 A1* | 6/2017 | Lee ............. H04L 5/0057 |

FOREIGN PATENT DOCUMENTS

| | | |
|---|---|---|
| CN | 103270714 A | 8/2013 |
| CN | 103503507 A | 1/2014 |
| CN | 103516446 A | 1/2014 |
| EP | 2 942 879 A2 | 11/2015 |
| WO | 2013169088 A1 | 11/2013 |
| WO | 2014/019168 A1 | 2/2014 |
| WO | 2015005678 A1 | 1/2015 |

OTHER PUBLICATIONS

Samsung, SCell activation and CQI reporting, 3GPP TSG-RAN2#72 meeting, Nov. 15-19, 2010, pp. 1-3, Tdoc*R2-106507, XP050492306, Jacksonville, U.S.

* cited by examiner

DEVICE AND METHOD OF HANDLING CHANNEL STATUS INFORMATION FOR UNLICENSED SERVING CELL

CROSS REFERENCE TO RELATED APPLICATIONS

This application claims the benefit of U.S. Provisional Application No. 62/109,079, filed on Jan. 29, 2015, which is incorporated herein by reference.

BACKGROUND OF THE INVENTION

1. Field of the Invention

The present invention relates to a communication device and a method used in a wireless communication system, and more particularly, to a communication device and method of handling channel status information for an unlicensed serving cell in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) using LTE, etc. For a UE and an eNB to communicate with each other in the LTE-A system, the UE and the eNB must support standards developed for the LTE-A system, such as the 3GPP Rel-10 standard or later versions.

Network operators propose to offload network traffic of the LTE/LTE-A system to an unlicensed serving cell, to ease load of the network traffic. For example, the eNB may provide services to the UE via the unlicensed serving cell. However, resource (e.g., service) in the unlicensed serving cell is not always available, and it is not easy for the UE to transmit a channel status information (CSI) report for the unlicensed serving cell to the eNB. The transmission of the CSI report for the unlicensed serving cell is even more complicated, when the UE operates on both a licensed serving cell and the unlicensed serving cell (e.g., in the CA case). In addition, resource for reporting the CSI report is usually limited, and collision may occur when multiple CSI reports are to be transmitted via the resource. Thus, the transmission of the CSI report(s) for the licensed serving cell (and the unlicensed serving cell) is thus an important problem to be solved.

SUMMARY OF THE INVENTION

The present invention therefore provides a method and related communication device for handling channel status information for an unlicensed serving cell to solve the abovementioned problem.

A communication device of handling a channel status information (CSI) report for an unlicensed serving cell comprises a storage unit for storing instructions and a processing means coupled to the storage unit. The processing means is configured to execute the instructions stored in the storage unit. The instructions comprise determining an indication for indicating a validity of an unlicensed CSI (U-CSI) report; and transmitting the indication to a network.

A communication device of handling a channel status information (CSI) report for an unlicensed serving cell comprises a storage unit for storing instructions and a processing means coupled to the storage unit. The processing means is configured to execute the instructions stored in the storage unit. The instructions comprise obtaining an unlicensed CSI (U-CSI) report according to a reference signal (RS); and transmitting the U-CSI report to a network, when a trigger is detected.

A communication device of handling a channel status information (CSI) report for an unlicensed serving cell comprises a storage unit for storing instructions and a processing means coupled to the storage unit. The processing means is configured to execute the instructions stored in the storage unit. The instructions comprise receiving a reference signal (RS) from a network, wherein the RS is for obtaining an unlicensed CSI (U-CSI) report; and stopping transmitting the U-CSI report to the network, if the communication device determines that the U-CSI report is invalid.

A communication device of handling a channel status information (CSI) report for an unlicensed serving cell comprises a storage unit for storing instructions and a processing means coupled to the storage unit. The processing means is configured to execute the instructions stored in the storage unit. The instructions comprise receiving a reference signal (RS) from a network, wherein the RS is for obtaining a licensed CSI (L-CSI) report; and stopping transmitting the L-CSI report to the network, if the communication device determines that the L-CSI report is invalid.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
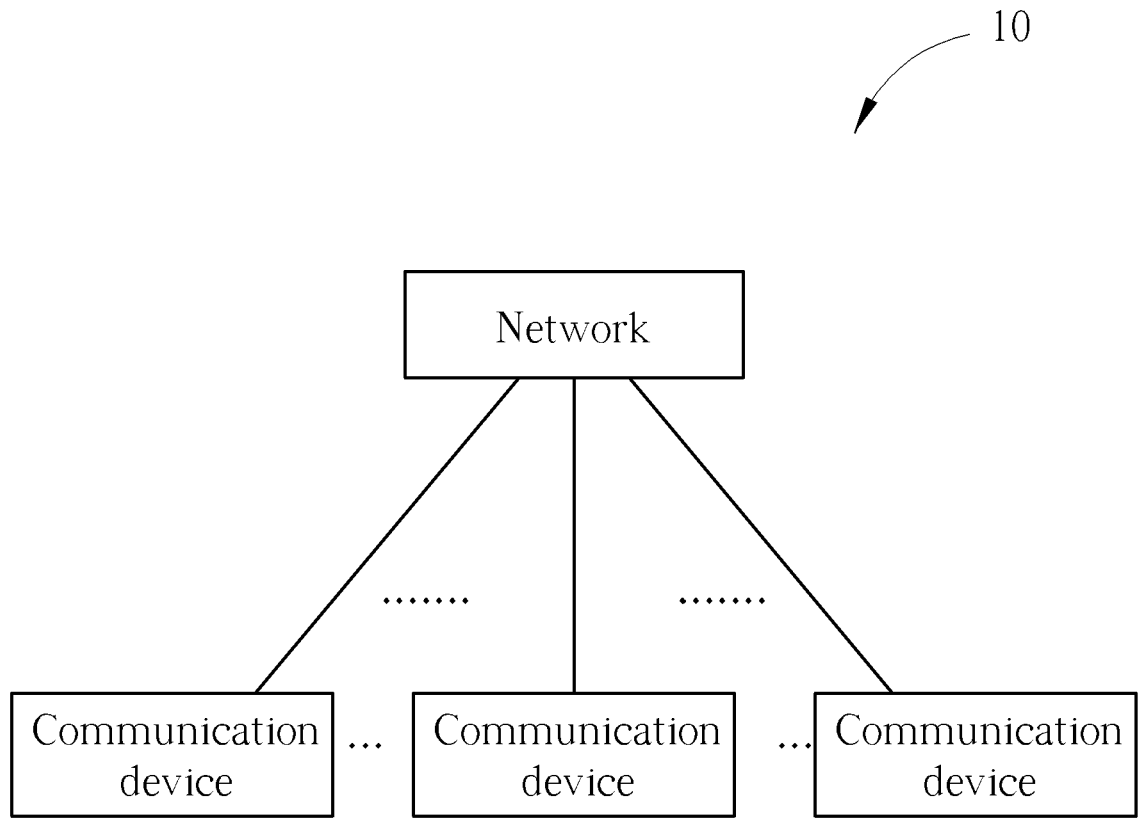
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The wireless communication system 10 may support a time-division duplexing (TDD) mode, a frequency-division duplexing (FDD) mode, a TDD-FDD joint operation mode or a licensed-assisted access (LAA) mode. That is, the network and a communication device may communicate with each other via FDD carrier(s), TDD carrier(s), licensed carrier(s) (licensed serving cell(s), licensed spectrum(s)) and/or unlicensed carrier(s) (unlicensed serving -cell (s), unlicensed spectrum(s)). The unlicensed cell may also be termed as a LAA secondary cell (SCell). In addition, the wireless communication system 10 may support a carrier aggregation (CA). That is, the network and a communication device may communicate with each other via multiple serving cells (e.g., multiple serving carriers) including a primary cell (e.g., primary component carrier) and one or more secondary cells (e.g., secondary component carriers).

Methods of utilizing an unlicensed carrier are various. For example, for a communication system (e.g., wireless communication system 10) which includes at least one base station (e.g., eNB), it may provide a wireless service via the unlicensed carrier without an assistance from a licensed serving cell, i.e., the communication system is not a LAA system. Accordingly, a communication device may communicate with the at least one base station via only the unlicensed carrier. In another example, the communication device may communicate with more than one base stations (e.g., 2) in the same time period (e.g., dual connectivity). And one of the base stations may only be configured with the unlicensed carrier for the wireless service.

In FIG. 1, the network and the communication devices are simply utilized for illustrating the structure of the wireless communication system 10. Practically, the network may be a universal terrestrial radio access network (UTRAN) including at least one Node-B (NB) in a universal mobile telecommunications system (UMTS). In another example, the network may be an evolved UTRAN (E-UTRAN) including at least one evolved NB (eNB) and/or at least one relay in a long term evolution (LTE) system, a LTE-Advanced (LTE-A) system or an evolution of the LTE-A system.

Furthermore, the network may also include both the UTRAN/E-UTRAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information may be processed by both the UTRAN/E-UTRAN and the core network, and the decisions are made after coordination and/or cooperation are performed by the UTRAN/E-UTRAN and the core network.

A communication device may be a user equipment (UE), a low cost device (e.g., machine type communication (MTC) device), a device-to-device (D2D) communication device, a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
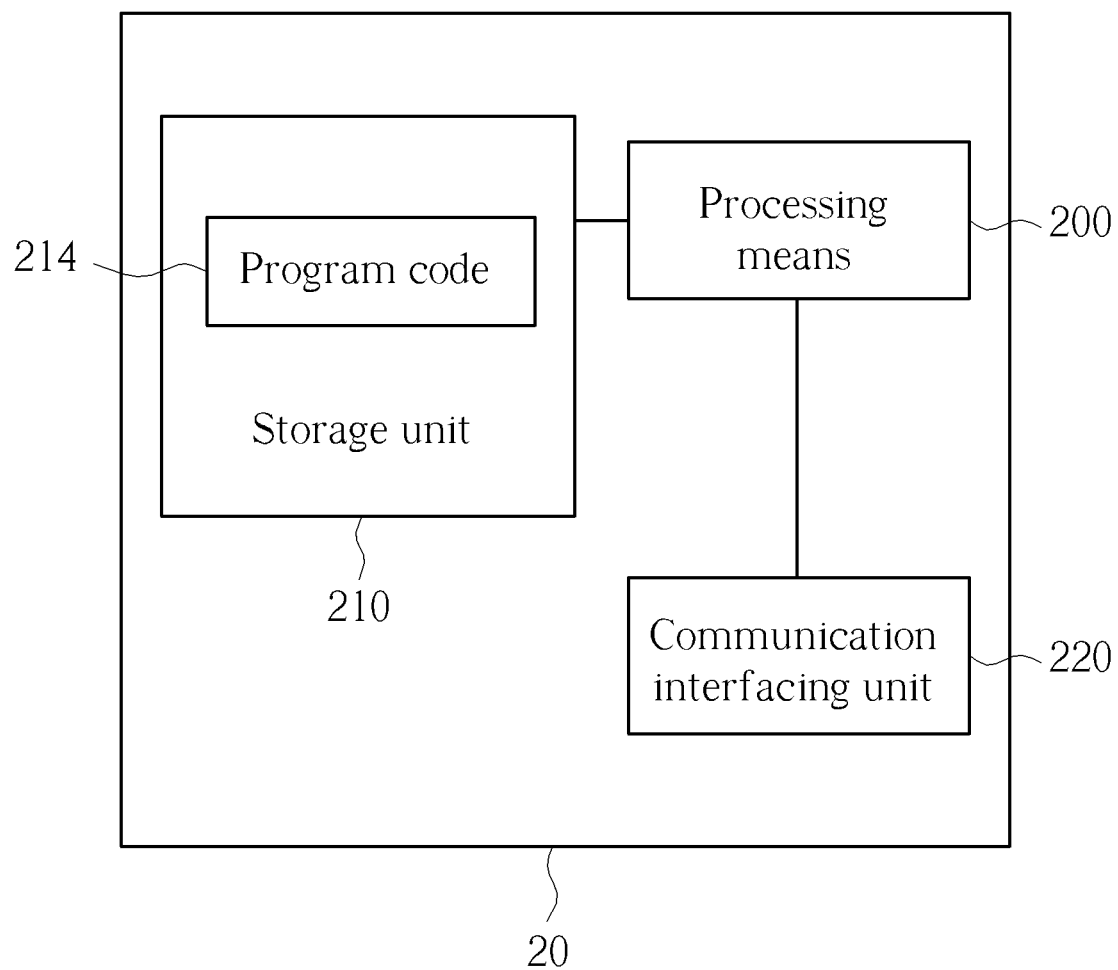
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing means 200.

Figure 3:
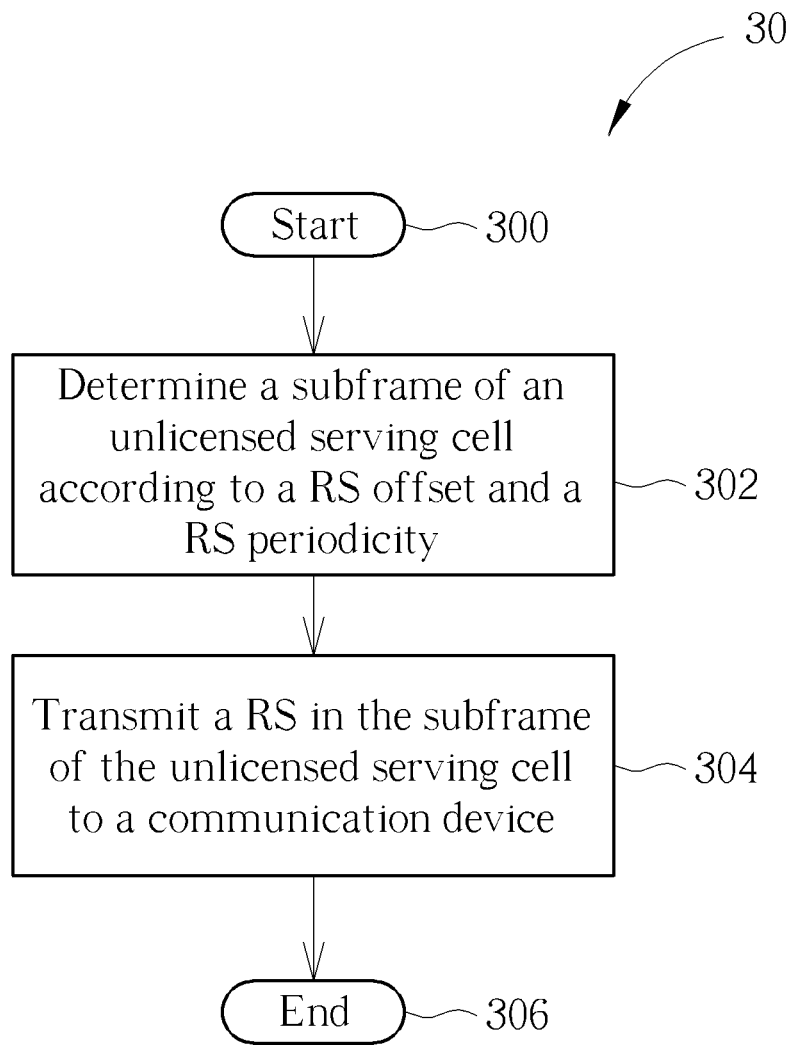
FIG. 3 is a flowchart of a process according to an example of the present invention.

FIG. 3 is a flowchart of a process 30 according to an example of the present invention. The process 30 may be utilized in the network shown in FIG. 1, to handle a reference signal (RS) for an unlicensed serving cell (e.g., controlled by the network in FIG. 1). The process 30 may be compiled into the program code 214 and includes the following steps:

Step 300: Start.

Step 302: Determine a subframe of an unlicensed serving cell according to a RS offset and a RS periodicity.

Step 304: Transmit a RS in the subframe of the unlicensed serving cell to a communication device.

Step 306: End.

According to the process 30, the network may determine a subframe of an unlicensed serving cell according to a RS offset and a RS periodicity. Then, the network may transmit a RS in the subframe of the unlicensed serving cell to a communication device. Further, the network may transmit the RS offset and the RS periodicity to the communication device, for the communication device to receive the RS correctly. Note that the RS may be a periodic RS, e.g., for performing a periodic channel status information (CSI) report. That is, the subframe may be determined according to both the RS offset and the RS periodicity, such that the RS for the unlicensed serving cell is transmitted in a region available for performing a LAA service. Note that a RS may be a CSI-RS, a common RS (CRS), or any signal capable of being used for obtaining (e.g., measuring) CSI to generate a CSI report, and is not limited herein. In this situation, the RS offset and the RS periodicity may be the CSI-RS offset and the CSI-RS periodicity, respectively. Thus, the problem that the RS may be scheduled in a region for performing a clear channel assessment (CCA) is solved.

Figure 4:
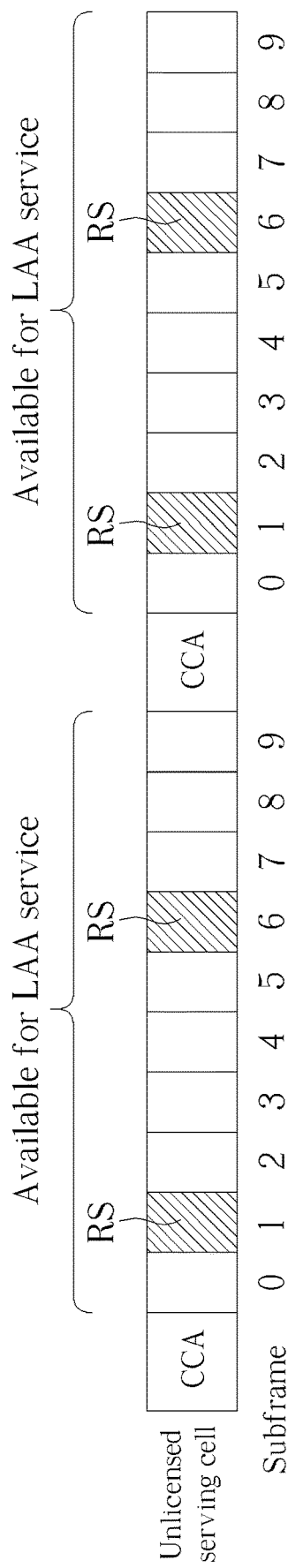
FIG. 4 is a schematic diagram of transmitting a RS for an unlicensed serving cell according to an example of the present invention.

FIG. 4 is a schematic diagram of transmitting a RS (e.g., CSI-RS) for an unlicensed serving cell according to an example of the present invention. In FIG. 4, a RS offset and a RS periodicity are configured as 1 and 5, respectively, for the unlicensed serving cell. As shown in FIG. 4, RSs are scheduled (e.g., transmitted) in subframes 1 and 6 in regions available for LAA services. Thus, a communication device can perform measurements correspondingly according to the RSs without being affected by regions for performing CCAs.

It should be noted that a CSI report (e.g., periodic CSI report) in the abovementioned examples may include rank indicator(s) (RI(s)), wideband channel quality indicator(s) (WB CQI(s)), subband CQI(s) (SB CQI(s)) and/or precoding matrix indicator(s) (PMI(s)), and is not limited herein.

Figure 5:
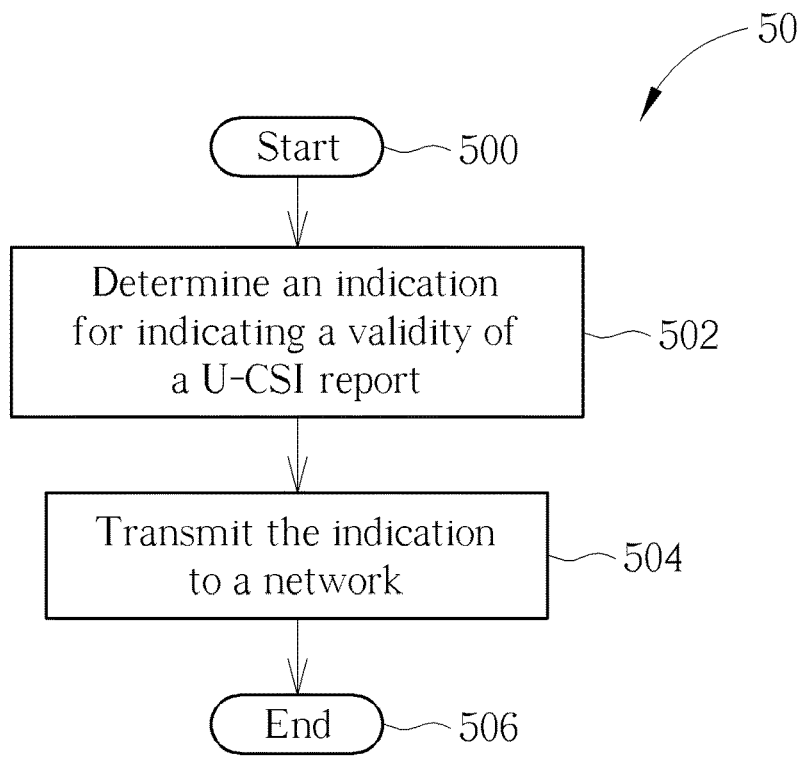
FIG. 5 is a flowchart of a process according to an example of the present invention.

FIG. 5 is a flowchart of a process 50 according to an example of the present invention. The process 50 may be utilized in a communication device in FIG. 1, to handle a CSI report for an unlicensed serving cell (e.g., controlled by the network in FIG. 1). The process 50 may be compiled into the program code 214 and includes the following steps:

Step 500: Start.

Step 502: Determine an indication for indicating a validity of a U-CSI report.

Step 504: Transmit the indication to a network.

Step 506: End.

According to the process 50, the communication device may determine an indication for indicating a validity of a U-CSI report. Then, the communication device may transmit the indication to a network. That is, the indication is used for indicating the validity of the U-CSU report to the network. Note that the U-CSI report may be a periodic U-CSI report or an aperiodic U-CSI report. In one example, the indication may include a predetermined CSI value. Further, the predetermined CSI value may include a lowest CQI value (e.g., out of range (OOR)). In another example, the predetermined CSI value may include a lowest rank indication (RI) value, a highest RI value, a lowest channel quality indicator (CQI) index, etc. That is, the indication already includes information of the U-CSI report, and the communication device may not need to transmit the U-CSI report to the network. The above example may be seen as an implicit method for indicating the U-CSI report. In another example, the communication device may transmit both the indication and the unlicensed U-CSI report to the network. In this situation, the validity is indicated explicitly to the network, and the method can be seen as an explicit method for indicating the U-CSI report. In one example, the validity of the U-CSI report may be determined as invalid, if a time difference between a first time instant for transmitting the U-CSI report and a second time instant for receiving a RS for obtaining the U-CSI report is greater than (or equal to) a predetermined threshold. Thus, the problem that an invalid U-CSI report may be transmitted to the network is solved.

It should be noted that a CSI report (e.g., U-CSI report) in any of the abovementioned examples may include RI(s), WB CQI(s), SB CQI(s) and/or PMI(s), and is not limited herein. In addition, a RS may be a CSI-RS, a CRS, or any signal capable of being used for obtaining (e.g., measuring) CSI to generate a CSI report, and is not limited herein.

Figure 6:
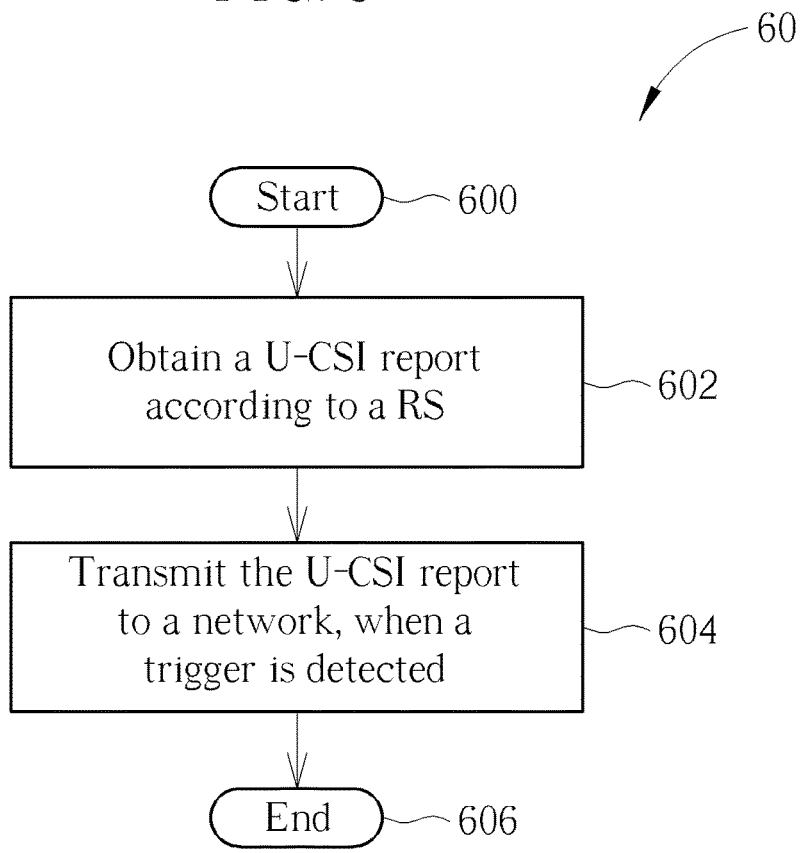
FIG. 6 is a flowchart of a process according to an example of the present invention.

FIG. 6 is a flowchart of a process 60 according to an example of the present invention. The process 60 may be utilized in a communication device in FIG. 1, to handle a CSI report for an unlicensed serving cell (e.g., controlled by the network in FIG. 1). The process 60 may be compiled into the program code 214 and includes the following steps:

Step 600: Start.

Step 602: Obtain a U-CSI report according to a RS.

Step 604: Transmit the U-CSI report to a network, when a trigger is detected.

Step 606: End.

According to the process 60, the communication device may obtain a U-CSI report according to a RS. Then, the communication device may transmit the U-CSI report (e.g., one-shot U-CSI report) to a network, when a trigger is detected. That is, the communication device does not transmit the U-CSI report periodically, but transmits the U-CSI report to the network according to the detected trigger. Note that the U-CSI report may be a periodic U-CSI report or an aperiodic U-CSI report. In one example, the trigger may include a start of a LAA service. That is, the communication device transmits the U-CSI report, after detecting the start of the LAA service. In one example, the trigger may include a detection (e.g., appearance) of the RS. That is, the communication device transmits the U-CSI report, after detecting the appearance of the RS. Note that a RS may be a CSI-RS, a CRS, or any signal capable of being used for obtaining (e.g., measuring) CSI to generate a CSI report, and is not limited herein. Thus, the problem that the U-CSI report may be scheduled in a region where the U-CSI report is not able to be transmitted is solved.

Figure 7:
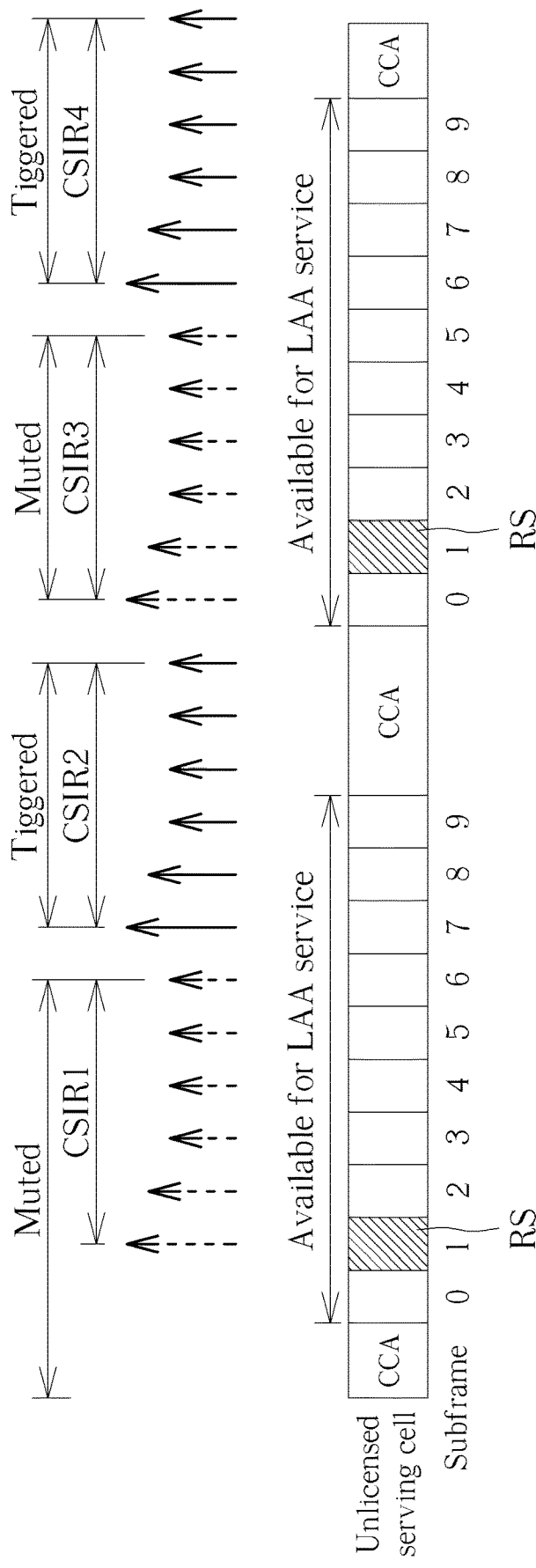
FIG. 7 is a schematic diagram of transmitting U-CSI reports for an unlicensed serving cell according to an example of the present invention.

FIG. 7 is a schematic diagram of transmitting U-CSI reports for an unlicensed serving cell according to an example of the present invention. In FIG. 7, 4 U-CSI reports CSIR1-CSIR4 are originally scheduled for the unlicensed serving cell. As shown in FIG. 7, the U-CSI reports CSIR1 and CSIR3 are not transmitted (i.e., muted). The U-CSI reports CSIR2 and CSIR4 are transmitted according to a trigger, e.g., a start of a LAA service in a subframe 0 or a detection of a RS in a subframe 1. Thus, a communication device can transmit the U-CSI reports properly.

It should be noted that a CSI report (e.g., U-CSI report) in any of the abovementioned examples may include RI(s), WB CQI(s), SB CQI(s) and/or PMI(s), and is not limited herein.

Figure 8:
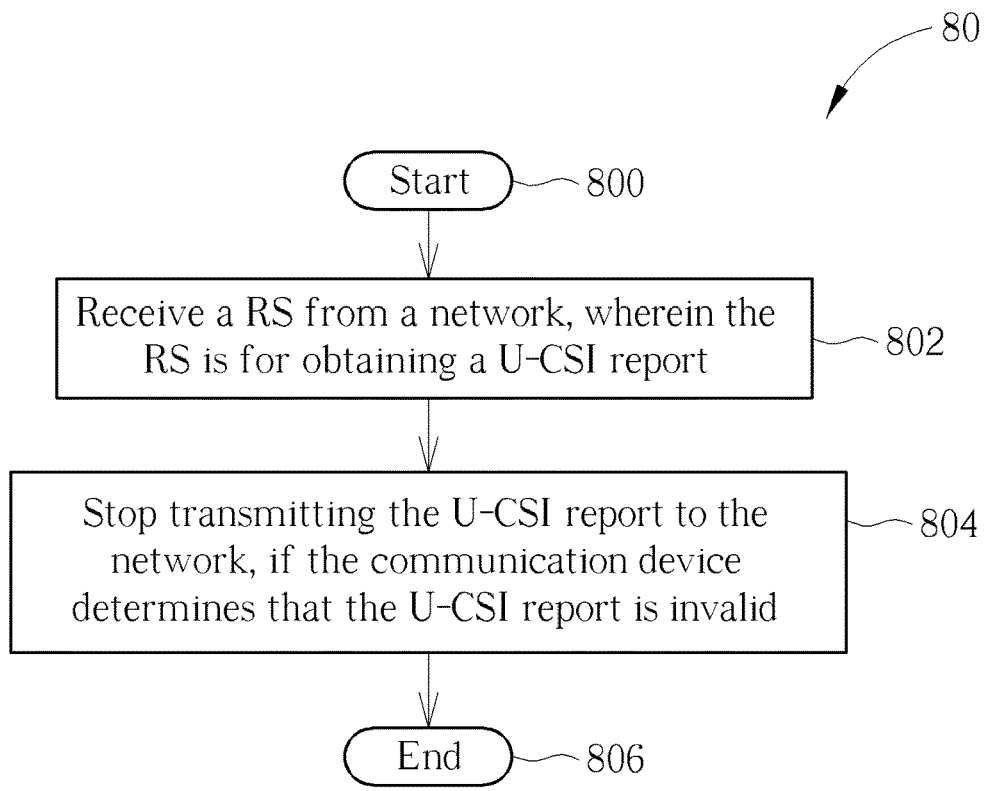
FIG. 8 is a flowchart of a process according to an example of the present invention.

FIG. 8 is a flowchart of a process 80 according to an example of the present invention. The process 80 may be utilized in a communication device in FIG. 1, to handle a CSI report for an unlicensed serving cell (e.g., controlled by the network in FIG. 1). The process 80 may be compiled into the program code 214 and includes the following steps:

Step 800: Start.

Step 802: Receive a RS from a network, wherein the RS is for obtaining a U-CSI report.

Step 804: Stop transmitting the U-CSI report to the network, if the communication device determines that the U-CSI report is invalid.

Step 806: End.

According to the process 80, the communication device may receive a RS from a network, wherein the RS is for obtaining a U-CSI report. Then, the communication device may stop transmitting the U-CSI report to the network, if the communication device determines that the U-CSI report is invalid. That is, the invalid U-CSI report is dropped. Note that the U-CSI report may be a periodic U-CSI report or an aperiodic U-CSI report. Note that a RS may be a CSI-RS, a CRS, or any signal capable of being used for obtaining (e.g., measuring) CSI to generate a CSI report, and is not limited herein. Thus, the network will not make an improper decision according to the invalid U-CSI report.

A criterion according to which the U-CSI report is determined as invalid is not limited. In one example, the communication device may stop obtaining the U-CSI report according to the RS. That is, power consumption may be further reduced by stopping performing computations related to the U-CSI report. In one example, the U-CSI report may be determined as invalid, if the U-CSI report collides with another U-CSI report which is triggered earlier than the U-CSI report. That is, a priority of an earlier triggered U-CSI report is configured with a higher priority. In one example, the communication device may transmit the other U-CSI report with a corresponding unlicensed serving cell index to the network. That is, the unlicensed serving cell index is used for indicating the U-CSI report which is transmitted to the network. In one example, the U-CSI report may be determined as invalid, if the U-CSI report collides with a L-CSI report. That is, a priority of the U-CSI report is lower than a priority of the L-CSI report. Further, the L-CSI report may belong to a primary cell. That is, the priorities from high to low are: the priority of the L-CSI report of the primary cell, the priority of the U-CSI report and a priority of the L-CSI report of a secondary cell. In one example, the U-CSI report may be determined as invalid, if a time difference between a first time instant for transmitting the U-CSI report and a second time instant for receiving the RS is greater than (or equal to) a predetermined threshold, wherein the RS is for obtaining (e.g., measuring) the U-CSI report. That is, the U-CSI report is determined as invalid, if the RS has been received for a long time (e.g., out of date). In one example, the communication device may further stop transmitting another CSI report to the network, if the U-CSI report collides with the other CSI report. That is, both of the CSI reports are not transmitted, if the CSI reports collide with each other.

It should be noted that a CSI report (e.g., U-CSI report and/or L-CSI report) in any of the abovementioned examples may include RI(s), WB CQI(s), SB CQI(s) and/or PMI(s), and is not limited herein.

Figure 9:
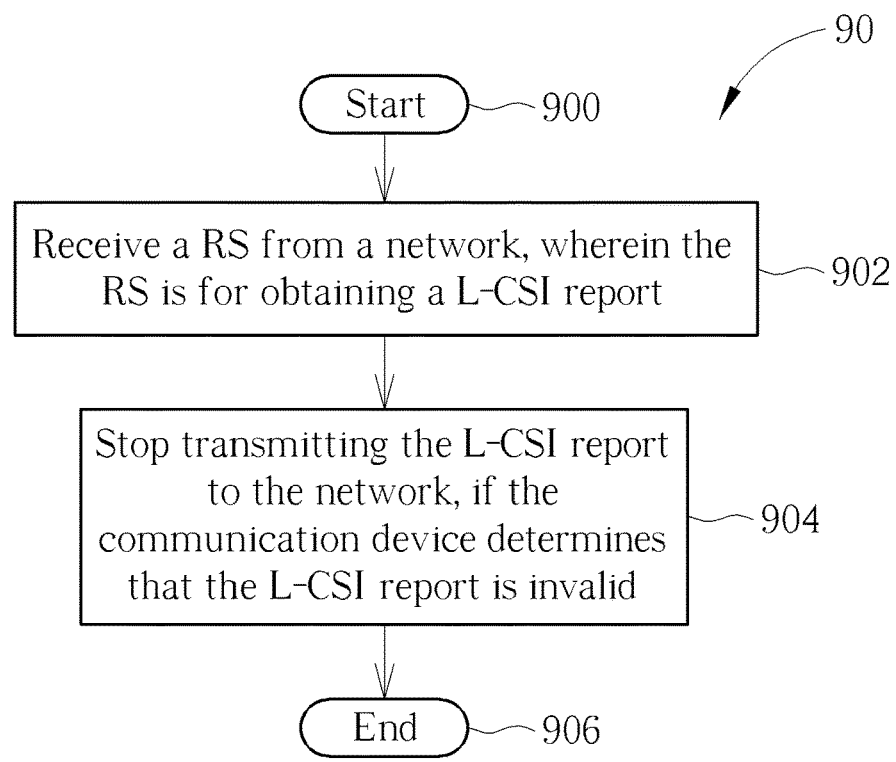
FIG. 9 is a flowchart of a process according to an example of the present invention.

FIG. 9 is a flowchart of a process 90 according to an example of the present invention. The process 90 may be utilized in a communication device in FIG. 1, to handle a CSI report for an unlicensed serving cell (e.g., controlled by the network in FIG. 1). The process 90 may be compiled into the program code 214 and includes the following steps:

Step 900: Start.

Step 902: Receive a RS from a network, wherein the RS is for obtaining a L-CSI report.

Step 904: Stop transmitting the L-CSI report to the network, if the communication device determines that the L-CSI report is invalid.

Step 906: End.

According to the process 90, the communication device may receive a RS from a network, wherein the RS is for obtaining a L-CSI report. Then, the communication device may stop transmit the L-CSI report to the network, if the communication device determines that the L-CSI report is invalid. That is, the invalid L-CSI report is dropped. Note that the L-CSI report may be a periodic L-CSI report or an aperiodic L-CSI report. Note that a RS may be a CSI-RS, a CRS, or any signal capable of being used for obtaining (e.g., measuring) CSI to generate a CSI report, and is not limited herein. Thus, the network will not make an improper decision according to the invalid L-CSI report.

A criterion according to which the L-CSI report is determined as invalid is not limited. In one example, the communication device may stop obtaining the L-CSI report according to the RS. That is, power consumption may be further reduced by stopping performing computations related to the L-CSI report. In one example, the L-CSI report may be determined as invalid, if the L-CSI report collides with a U-CSI report. That is, a priority of the U-CSI report is higher than a priority of the L-CSI report. In one example, the communication device may transmit the U-CSI report with a corresponding unlicensed serving cell index to the network. That is, the unlicensed serving cell index is used for indicating the U-CSI report which is transmitted to the network. In one example, the L-CSI report may belong to a secondary cell. That is, the priorities from high to low are: the priority of the L-CSI report of the primary cell, the priority of the U-CSI report and a priority of the L-CSI report of a secondary cell. In one example, the communication device may further stop transmitting another CSI report to the network, if the L-CSI report collides with the other CSI report. That is, both of the CSI reports are not transmitted, if the CSI reports collide with each other.

It should be noted that a CSI report (e.g., U-CSI report and/or L-CSI report) in any of the abovementioned examples may include RI(s), WB CQI(s), SB CQI(s) and/or PMI(s), and is not limited herein.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides device and a method for handling a CSI report. The problem that the RS may be scheduled in a region for performing a CCA is solved. An invalid CSI report is identified, and is not transmitted to a network. Thus, the network will not make an improper decision according to the invalid CSI report.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device of handling a channel status information (CSI) report for an unlicensed serving cell, comprising:
a storage device, for storing instructions of:
determining an indication for indicating a validity of an unlicensed CSI (U-CSI) report;
transmitting the indication to a network; and
stopping, based on the U-CSI report being invalid, obtaining the U-CSI report according to a CSI reference signal (CSI-RS);
wherein the validity of the U-CSI report is determined as invalid, when a time difference between a first time instant for transmitting the U-CSI report and a second time instant for receiving the CSI-RS for obtaining the U-CSI report is greater than or equal to a predetermined threshold; and
a processing circuit, coupled to the storage device, configured to execute the instructions stored in the storage device.

2. The communication device of claim 1, wherein the U-CSI report is a periodic U-CSI report.

3. The communication device of claim 1, wherein the indication comprises a predetermined CSI value.

4. The communication device of claim 3, wherein the predetermined CSI value comprises a lowest CQI.

5. The communication device of claim 3, wherein the predetermined CSI value comprises a lowest RI value or a highest RI value.

\* \* \* \* \*